H. L. ARNOLD.
Set-up Devices for Knitting-Machines.
No. 142,429.                    Patented September 2, 1873.
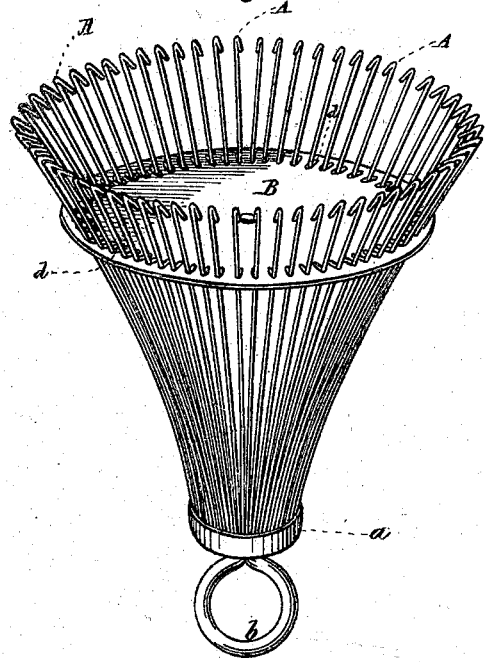
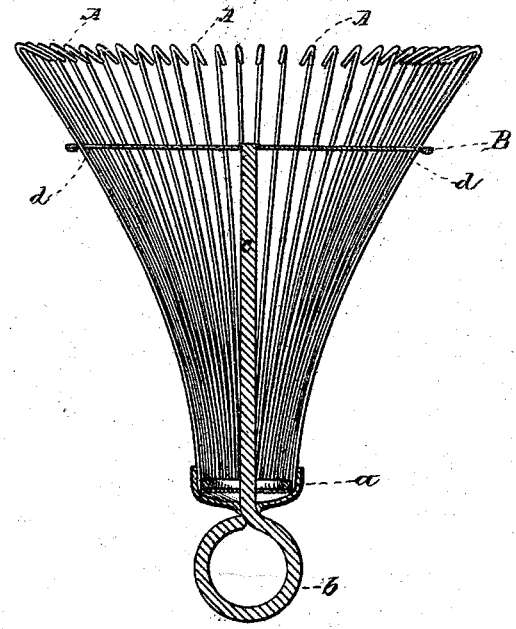
Witnesses
Phil. F. Larner
Geo. F. Stenz
Inventor
Horace L. Arnold
By McLeod
Attorney

UNITED STATES PATENT OFFICE.

HORACE L. ARNOLD, OF OTTAWA, ILLINOIS.

IMPROVEMENT IN SET-UP DEVICES FOR KNITTING-MACHINES.

Specification forming part of Letters Patent No. 142,429, dated September 2, 1873; application filed February 12, 1873.

*To all whom it may concern:*

Be it known that I, HORACE L. ARNOLD, of Ottawa, in the county of La Salle, in the State of Illinois, have invented a certain new and useful Set-Up for Knitting-Machines.

My invention consists in combining the several set-up hooks, arranged in the form of an inverted cone, with a central weight-eye and a controlling-plate, whereby a uniform drag on all the hooks may be maintained, and also whereby each hook, while being confined within certain limits, may be free to vibrate to a certain definable degree; and I do hereby declare that the following specification, taken in connection with the drawings accompanying and forming a part of the same, is a true and clear description of my invention.

Referring to the drawings, Figure 1 represents my improved set-up in perspective. Fig. 2 represents the same in vertical section.

A, in each instance, denotes one of, say, seventy-five set-up hooks, more or less. They are arranged in a circle, with the hooks all turned inward radially toward the center. The hooks are composed of hard-drawn brass wire, with extended shanks to afford desirable elasticity. These hooks are so curved that, when occupying their proper position, they constitute a hollow conical structure with the point extending downward. At their upper ends the hooks are spaced so as to coincide generally with the spaces between the needles on the machine with which the set-up is to be used. The lower ends of the shanks are inserted in a small cup, *a*, to which the weight-eye *b* is attached. I prefer that this cup be just large enough to be filled by the several shanks placed side by side around its inner circumference. A coil of heavy wire is then forced into the cup so as to securely press the shanks of the hooks between it and the inside of the cup. The cup, coil, and shanks are then firmly united by the use of soft solder. B denotes a controlling-plate. It is circular in form, and has adjacent to its edge a series of oblong apertures, *d*, through each of which a hook passes. It is connected with the cup *b* by a rod, *c*, occupying the center of the set-up.

The plate B is located a short distance below the hooks, and the apertures *d* are of such length as will allow to the hooks a sufficient degree of movement. The controlling-plate serves, practically, as a safe-guard against injury to the hooks by ordinary usage or the accidental dropping of the set-up, and contribute largely to its value by such protection. The rod *c* may be an extension of the wire forming the weight-eye.

By having the several hooks extended upward from a central weight-eye, the draft on the several hooks is readily equalized, and the range of motion permitted by the controlling-plate is ample to allow of the swinging of the weight without occasioning any undue strain on any of the hooks.

Having thus described my invention, I claim as new and desire to secure by Letters Patent—

The several hooks, arranged in the form of an inverted cone, and secured at their bases in and to the cup *a*, in combination with the slotted controlling-plate B and the weight-eye, substantially as described.

HORACE L. ARNOLD.

Witnesses:
JOHN J. KELLOGG,
EDWIN O. BESSEE.